Patented Dec. 9, 1930

1,784,497

UNITED STATES PATENT OFFICE

WALTER SCHOELLER, ERICH BORGWARDT, AND ADOLF FELDT, OF BERLIN, GERMANY, ASSIGNORS TO CHEMISCHE FABRIK AUF ACTIEN (VORM. E. SCHERING.), OF BERLIN, GERMANY, A FIRM

ORGANIC METALLO MERCAPTO SULPHONIC COMPOUND AND PROCESS OF MAKING SAME

No Drawing. Application filed April 26, 1927, Serial No. 186,815, and in Germany May 5, 1926.

Our invention refers to the production of organic metallo mercapto sulphonic compounds which corresponds to the formula

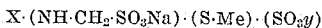
X·(NH·CH$_2$·SO$_3$Na)·(S·Me)·(SO$_3$y)

wherein X is an aliphatic, or aromatic or heterocyclic radical, Me a heavy metal and y either H or a metal, preferably an alkali or alkaline earth metal. The new compounds which are employed especially in the form of their water-soluble alkali or alkaline earth salts, are produced by the action of formaldehyde bisulphites (oxymethane sulphonic salts) on amino metallo mercapto sulphonic acids or the salts thereof. The derivatives thus obtained are distinguished by an increased therapeutical efficiency and stability, being also nonpoisonous.

The new compounds are slightly yellow colored substances which dissolve very readily in water and can be precipitated from such solutions by alcohol or methyl alcohol.

The invention is illustrated in the following examples, the parts being by weight.

Example I 37,6 parts β-amino-α-auromercapto ethane sulphonic sodium (obtainable from β-amino-α-chlorethane sulphonic acid (Berichte 15, 446) by treatment with alcoholic potassium sulfhydrate and introduction of gold, are dissolved in 150 parts water. To the solution are added 15 parts formaldehyde sodium bisulphite and the solution is then heated to 90° C. After cooling, the formaldehyde bisulphite compound which has formed in the solution is precipitated with methyl alcohol. It represents an almost colorless powder readily dissolving in water and having a gold content of 39 per cent. Its formula is

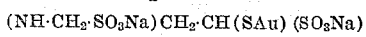
(NH·CH$_2$·SO$_3$Na) CH$_2$·CH(SAu) (SO$_3$Na)

Example II 42,3 parts of 3-amino-4-auromercapto benzene-1-sulphonic sodium (obtained from 2-nitroaniline-4-sulphonic acid by diazotization, decomposition of the diazo product with potassium thiocyanate, reduction of the 3-nitro-4-benzene thiocyanate-1-sulphonic acid formed by such decomposition, and introduction of gold) are dissolved in 200 parts water. To the solution are added 13 parts formaldehyde sodium bisulphite and the solution is then heated to boiling point. After cooling the formaldehyde bisulphite compound is precipitated with alcohol. The compound is readily soluble in water and has a gold content of 36 per cent. Its formula is

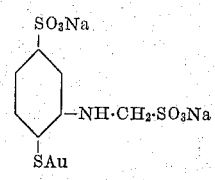

Example III 17 parts N-(α-β'-aminopyridyl)-4-amino-2-auromercaptobenzene-1-sulphonic sodium (C$_6$H$_3$·(SO$_3$Na)·(SAu)·NH·(C$_5$H$_3$N)·NH$_2$) (prepared from 4-amino-2-mercaptobenzene-1-sulphonic sodium and α-chloro-β'-nitropyridin, the nitro compound formed in this reaction being reduced and gold being introduced) are dissolved in 50 parts water and are heated to 80–90° C. with 5 parts formaldehyde sodium bisulphite. After cooling the product of condensation is precipitated with alcohol. It forms a brownish yellow powder readily dissolving in water and having a gold content of 31 per cent. Its formula is

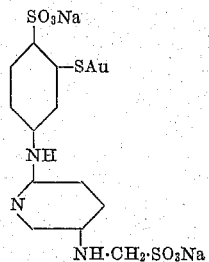

Example IV 33,4 parts 3-amino-4-argentomercapto benzene-1-sulphonic sodium are dissolved in 160 parts water. After the addition of 15 parts formaldehyde sodium bisulphite the solution is heated to boiling point under stirring. After cooling the formaldehyde bisulphite compound is precipitated with alcohol. It is readily soluble in water and has a silver content of 24 per cent. Its formula is

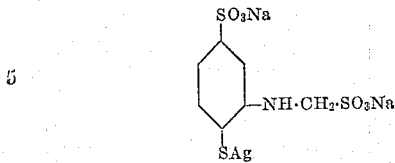

Various changes may be made in the details disclosed in the foregoing specification without departing from the invention or sacrificing the advantages thereof.

We claim:—

1. As new products organic metallo mercapto sulphonic compounds corresponding to the formula

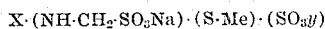

wherein X is an aliphatic, aromatic, or heterocyclic radical, Me a heavy metal and $y$ either H or a metal.

2. As a new product, the compound corresponding to the formula

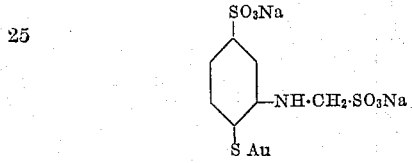

being readily soluble in water and containing about 36 per cent gold.

3. The process which consists in causing a formaldehyde bisulphite to act on an amino compound of a metallo mercapto sulphonic acid compound.

In testimony whereof we affix our signatures.

WALTER SCHOELLER.
ERICH BORGWARDT.
ADOLF FELDT.